US008543995B2

(12) United States Patent
Tamura et al.

(10) Patent No.: US 8,543,995 B2
(45) Date of Patent: Sep. 24, 2013

(54) INFORMATION PROCESSOR, INFORMATION PROCESSING METHOD, AND COMPUTER-READABLE STORAGE MEDIUM

(75) Inventors: Shingo Tamura, Kanagawa (JP); Hiroshi Kobayashi, Kanagawa (JP); Yoshihiro Ogura, Kanagawa (JP); Shunichi Maeda, Chiba (JP); Tomoki Yoshida, Kanagawa (JP); Mitsuo Nakamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 630 days.

(21) Appl. No.: 12/833,027

(22) Filed: Jul. 9, 2010

(65) Prior Publication Data

US 2011/0016464 A1   Jan. 20, 2011

(30) Foreign Application Priority Data

Jul. 17, 2009  (JP) ................................. 2009-168441
Jun. 24, 2010  (JP) ................................. 2010-143835

(51) Int. Cl.
*G06F 9/44*     (2006.01)
*G06F 9/445*    (2006.01)

(52) U.S. Cl.
USPC ............ 717/170; 717/122; 717/126; 717/177

(58) Field of Classification Search
None
See application file for complete search history.

(56) References Cited

U.S. PATENT DOCUMENTS

| | | | |
|---|---|---|---|
| 6,496,974 B1 * | 12/2002 | Sliger et al. | 717/122 |
| 6,704,933 B1 | 3/2004 | Tanaka et al. | |
| 6,763,517 B2 * | 7/2004 | Hines | 717/126 |
| 7,150,015 B2 * | 12/2006 | Pace et al. | 717/177 |
| 7,313,792 B2 * | 12/2007 | Buban et al. | 717/170 |
| 7,568,195 B2 * | 7/2009 | Markley et al. | 717/170 |

(Continued)

FOREIGN PATENT DOCUMENTS

| | | |
|---|---|---|
| EP | 0 703 531 | 3/1996 |
| EP | 1 548 586 | 6/2005 |

(Continued)

OTHER PUBLICATIONS

Petr Pp Kubon; Information Packing Revisitted; [Mar. 1999]; retrieved online on Jun. 9, 2013; pp. 1-282; Retrieved from the Internet: <URL: http://fas.sfu.ca/pub/cs/theses/1999/PetrKubon Ph D.pdf>.*

(Continued)

*Primary Examiner* — Thuy Dao
*Assistant Examiner* — Hanh T Bui
(74) *Attorney, Agent, or Firm* — IPUSA, LLC (57) ABSTRACT

An information processor includes a first part storing one or more programs included in one or more packages; a second part correlating and retaining the package and version information of the programs on a program basis; a third part comparing, if one of the installed programs is to be installed, the version information of the installed one of the programs and the one of the programs to be installed; a fourth part determining whether the one of the programs to be installed is subordinate to a package other than a package including the one of the programs to be installed, if the version information of the one of the programs to be installed is determined to be lower; and a fifth part installing the one of the programs to be installed if the one of the programs to be installed is determined to be not subordinate to the other package.

5 Claims, 10 Drawing Sheets

(56) References Cited

U.S. PATENT DOCUMENTS

| | | | |
|---|---|---|---|
| 7,593,661 B2 | 9/2009 | Watanabe et al. | |
| 7,720,875 B2 | 5/2010 | Maeda | |
| 7,987,449 B1* | 7/2011 | Marolia et al. | 717/122 |
| 8,020,149 B2* | 9/2011 | Wolf | 717/126 |
| 8,074,205 B2* | 12/2011 | Shastry et al. | 717/126 |
| 8,397,230 B2* | 3/2013 | Ewington et al. | 717/177 |
| 8,448,161 B2* | 5/2013 | Goldman | 717/170 |
| 2003/0014381 A1 | 1/2003 | McMillan et al. | |
| 2003/0051236 A1* | 3/2003 | Pace et al. | 717/177 |
| 2006/0033950 A1 | 2/2006 | Nakamura | |
| 2006/0184932 A1 | 8/2006 | Burnley et al. | |
| 2007/0006222 A1* | 1/2007 | Maier et al. | 717/170 |
| 2007/0058195 A1 | 3/2007 | Nakamura et al. | |
| 2007/0294685 A1* | 12/2007 | Oh | 717/168 |
| 2008/0007794 A1 | 1/2008 | Yoshida | |
| 2008/0092130 A1 | 4/2008 | Maeda | |
| 2008/0120394 A1 | 5/2008 | Yokoyama et al. | |
| 2008/0134011 A1 | 6/2008 | Ogura | |
| 2008/0144097 A1 | 6/2008 | Yoshida | |
| 2008/0148250 A1* | 6/2008 | Motta | 717/170 |
| 2008/0195590 A1 | 8/2008 | Nakamura et al. | |
| 2009/0051952 A1 | 2/2009 | Abe et al. | |
| 2009/0070755 A1* | 3/2009 | Taylor et al. | 717/168 |
| 2009/0089076 A1 | 4/2009 | Asakimori et al. | |
| 2009/0190147 A1 | 7/2009 | Uruta et al. | |
| 2009/0225356 A1 | 9/2009 | Satoh et al. | |
| 2009/0323107 A1 | 12/2009 | Maeda | |
| 2010/0235433 A1* | 9/2010 | Ansari et al. | 709/203 |
| 2010/0251232 A1* | 9/2010 | Shinomiya | 717/177 |
| 2011/0113424 A1* | 5/2011 | Ewington et al. | 717/177 |
| 2012/0144378 A1* | 6/2012 | Shah | 717/170 |
| 2012/0222025 A1* | 8/2012 | Pandit | 717/170 |
| 2012/0324435 A1* | 12/2012 | Somani et al. | 717/170 |

FOREIGN PATENT DOCUMENTS

| | | |
|---|---|---|
| JP | 2000-293365 | 10/2000 |
| JP | 2007-004377 | 1/2007 |
| WO | WO 00/77614 | 12/2000 |

OTHER PUBLICATIONS

Paulo Trezentos et al.; Apt-pbo: Solving the Software Dependency Problem using Pseudo-Boolean Optimization; [2010]; retrieved online on Jun. 9, 2013; pp. 427-436; Retrieved from the Internet: <URL: http://delivery.acm.org/10.1145/1860000/1859087/p427-trezentos.pdf?>.*

Eya Ben Charrada et al.; Identifying Outdated Requirements Based on Source Code Changes; [2012]; retrieved online on Jun. 9, 2013; pp. 61-70; Retrieved from the Internet <URL: http://ieeexplore.ieee.org/stamp/stamp.jsp?tp=&arnumber=6345840>.*

Extended European Search Report.

* cited by examiner

| FUNCTION PKG (CURRENT Ver.) | SALES PKG TO WHICH FUNCTION PKG BELONGS | VERSION INCLUDED IN SALES PKG |
|---|---|---|
| FUNCTION PKG1(Ver. 1.00) | SALES PKG_A | Ver. 1.00 |
| FUNCTION PKG2(Ver. 1.00) | SALES PKG_A | Ver. 1.00 |

(b)

| FUNCTION PKG (CURRENT Ver.) | SALES PKG TO WHICH FUNCTION PKG BELONGS | VERSION INCLUDED IN SALES PKG |
|---|---|---|
| FUNCTION PKG2(Ver. 1.00) | SALES PKG_B | Ver. 1.00 |
| FUNCTION PKG3(Ver. 1.00) | SALES PKG_B | Ver. 1.00 |

| FUNCTION PKG | OPERATION | SUBORDINATION INFORMATION |
|---|---|---|
| FUNCTION PKG1 | − | − |
| FUNCTION PKG2 | NO OPERATION BECAUSE SAME VERSION HAS BEEN INSTALLED | ADD SUBORDINATION INFORMATION OF SALES PKG_B |
| FUNCTION PKG3 | INSTALL Ver. 1.00 | ADD SUBORDINATION INFORMATION OF SALES PKG_B |

(c)

| FUNCTION PKG (CURRENT Ver.) | SALES PKG TO WHICH FUNCTION PKG BELONGS | VERSION INCLUDED IN SALES PKG |
|---|---|---|
| FUNCTION PKG1 (Ver. 1.00) | SALES PKG_A | Ver. 1.00 |
| FUNCTION PKG2 (Ver. 1.00) | SALES PKG_A | Ver. 1.00 |
|  | SALES PKG_B | Ver. 1.00 |
| FUNCTION PKG3 (Ver. 1.00) | SALES PKG_B | Ver. 1.00 |

| FUNCTION PKG | OPERATION | SUBORDINATION INFORMATION |
|---|---|---|
| FUNCTION PKG1 | UPDATE Ver. 1.00 TO Ver. 2.00 | UPDATE SUBORDINATION INFORMATION OF SALES PKG_A |
| FUNCTION PKG2 | UPDATE Ver. 1.00 TO Ver. 2.00 | UPDATE SUBORDINATION INFORMATION OF SALES PKG_A |
| FUNCTION PKG3 | - | - |

(c)

| FUNCTION PKG (CURRENT Ver.) | SALES PKG TO WHICH FUNCTION PKG BELONGS | VERSION INCLUDED IN SALES PKG |
|---|---|---|
| FUNCTION PKG1 (Ver. 1.00 TO Ver. 2.00) | SALES PKG_A | Ver. 1.00 TO Ver. 2.00 |
| FUNCTION PKG2 (Ver. 1.00 TO Ver. 2.00) | SALES PKG_A | Ver. 1.00 TO Ver. 2.00 |
|  | SALES PKG_B | Ver. 1.00 |
| FUNCTION PKG3 (Ver. 1.00) | SALES PKG_B | Ver. 1.00 |

| FUNCTION PKG | OPERATION | SUBORDINATION INFORMATION |
|---|---|---|
| FUNCTION PKG1 | - | - |
| FUNCTION PKG2 | NO OPERATION BECAUSE SAME VERSION HAS BEEN INSTALLED | UPDATE SUBORDINATION INFORMATION OF SALES PKG_B |
| FUNCTION PKG3 | UPDATE Ver. 1.00 TO Ver. 2.00 | UPDATE SUBORDINATION INFORMATION OF SALES PKG_B |

(c)

| FUNCTION PKG (CURRENT Ver.) | SALES PKG TO WHICH FUNCTION PKG BELONGS | VERSION INCLUDED IN SALES PKG |
|---|---|---|
| FUNCTION PKG1 (Ver. 2.00) | SALES PKG_A | Ver. 2.00 |
| FUNCTION PKG2 (Ver. 2.00) | SALES PKG_A | Ver. 2.00 |
|  | SALES PKG_B | Ver. 1.00 TO Ver. 2.00 |
| FUNCTION PKG3 (Ver. 1.00 TO Ver. 2.00) | SALES PKG_B | Ver. 1.00 TO Ver. 2.00 |

↓ INSTALL (b)

| FUNCTION PKG | OPERATION | SUBORDINATION INFORMATION |
|---|---|---|
| FUNCTION PKG1 | UPDATE Ver. 2.00 TO Ver. 1.00 | UPDATE SUBORDINATION INFORMATION OF SALES PKG_A |
| FUNCTION PKG2 | UPDATE Ver. 2.00 TO Ver. 1.00 *UPDATING IS AUTHORIZED BECAUSE VERSION IS HIGHER THAN OR EQUAL TO VERSION SUBORDINATE TO ANOTHER SALES PACKAGE (SALES PKG_B) | UPDATE SUBORDINATION INFORMATION OF SALES PKG_A |
| FUNCTION PKG3 | — | — |

(c)

| FUNCTION PKG (CURRENT Ver.) | SALES PKG TO WHICH FUNCTION PKG BELONGS | VERSION INCLUDED IN SALES PKG |
|---|---|---|
| FUNCTION PKG1 (Ver. 2.00 TO Ver. 1.00) | SALES PKG_A | Ver. 2.00 TO Ver. 1.00 |
| FUNCTION PKG2 (Ver. 2.00 TO Ver. 1.00) | SALES PKG_A | Ver. 2.00 TO Ver. 1.00 |
|  | SALES PKG_B | Ver. 1.00 |
| FUNCTION PKG3 (Ver. 1.00) | SALES PKG_B | Ver. 1.00 |

INFORMATION PROCESSOR, INFORMATION PROCESSING METHOD, AND COMPUTER-READABLE STORAGE MEDIUM

BACKGROUND OF THE INVENTION

1. Field of the Invention

The present invention relates to a technique for installing a program.

2. Description of the Related Art

In information processors that implement various functions by executing programs, it is possible to change (that is, increase and decrease) the number of functions by changing the number of programs to be installed. Even after purchasing information processors, users are allowed to use desired functions by purchasing and installing programs that provide the functions.

On the other hand, by way of example, Japanese Laid-Open Patent Application No. 2000-293365 teaches (a) storing a previously downloaded version of the program in order to restore the original configuration in case there is a problem in the upgrade of the program; and (b) invalidating the current version of the program and validating the previous version of the program at the time of downgrading.

SUMMARY OF THE INVENTION

According to one aspect of the present invention, an information processor includes a storage part configured to store one or more programs included in one or more packages and installed on a package basis, the programs including package information of the respective packages and version information of respective versions; a subordination information retention part configured to correlate the package information with the version information and retain the correlated package information and version information in the storage part on a program basis; a version comparison part configured to compare, if one of the installed programs is to be installed, the version information of the installed one of the programs with version information of the one of the programs to be installed; a subordination determination part configured to determine whether the one of the programs to be installed is subordinate to a package other than a package including the one of the programs to be installed, if the comparison by the version comparison part determines that the version information of the one of the programs to be installed is lower than the compared version information; and an installation part configured to install the one of the programs to be installed if the subordination determination part determines that the one of the programs to be installed is not subordinate to the other package.

According to one aspect of the present invention, an information processing method in an information processor, where one or more programs included in one or more packages are installed in a storage part on a package basis, the programs including package information of the respective packages and version information of respective versions, and the package information is correlated with the version information and the correlated package information and version information are retained in the storage part on a program basis, includes comparing, if one of the installed programs is to be installed, the version information of the installed one of the programs with version information of the one of the programs to be installed; determining whether the one of the programs to be installed is subordinate to a package other than a package including the one of the programs to be installed, if the comparison by the comparing determines that the version information of the one of the programs to be installed is lower than the compared version information; and installing the one of the programs to be installed if the determining determines that the one of the programs to be installed is not subordinate to the other package.

According to one aspect of the present invention, a computer-readable storage medium is provided that stores a program for causing a processor of a computer to execute the information processing method as set forth above.

The object and advantages of the invention will be realized and attained by means of the elements and combinations particularly pointed out in the claims.

It is to be understood that both the foregoing general description and the following detailed description are exemplary and explanatory and not restrictive of the invention, as claimed.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

According to, for example, the technique of Japanese Laid-Open Patent Application No. 2000-293365 mentioned above, there is a problem in that in an information processor that installs (or updates) one or more program components included in a single package in a storage device on a package-by-package basis, downgrading cannot be performed safely in the case of a package including (containing) a program component shared by multiple packages.

According to one aspect of the present invention, such an information processor and an information processing method are provided that allow downgrading to be performed safely in the case of a package including (containing) a program component shared by multiple packages in an information processor that installs (or updates) one or more program components included in a single package in a storage device on a package-by-package basis. Further, a computer-readable storage medium is provided that is stored with a program for causing a computer to execute such an information processing method.

A description is given below, with reference to the accompanying drawings, of an embodiment of the present invention.

First, a description is given of the definitions of terms used in this embodiment.

A sales package is a collection of multiple function packages for implementing a function. Examples of the sales package include a copy application sales package, a printer application sales package, and a facsimile (FAX) application sales package. A function package is the smallest program unit (plug-in component) operable in apparatuses. Examples of the function package include a printing control function package, a scanner control function package, and various user interface (UI) function packages.

A software unit visible to users is a sales package. Operations such as installation, updating, and uninstallation are performed on a sales-package basis. Sales packages are installed, updated (that is, upgraded or downgraded), and uninstalled in accordance with a user-desired environment.

The function package is installed in apparatuses as a subordinate component of a sales package. The function package may be subordinate to (included in) multiple sales packages. For example, a function package such as one for printing control may be included in each of sales packages associated with printing operations, such as those for copying, printing, and FAX communications.

A description is given of a hardware configuration of an information processor 100 according to the embodiment of the present invention.

Figure 1:
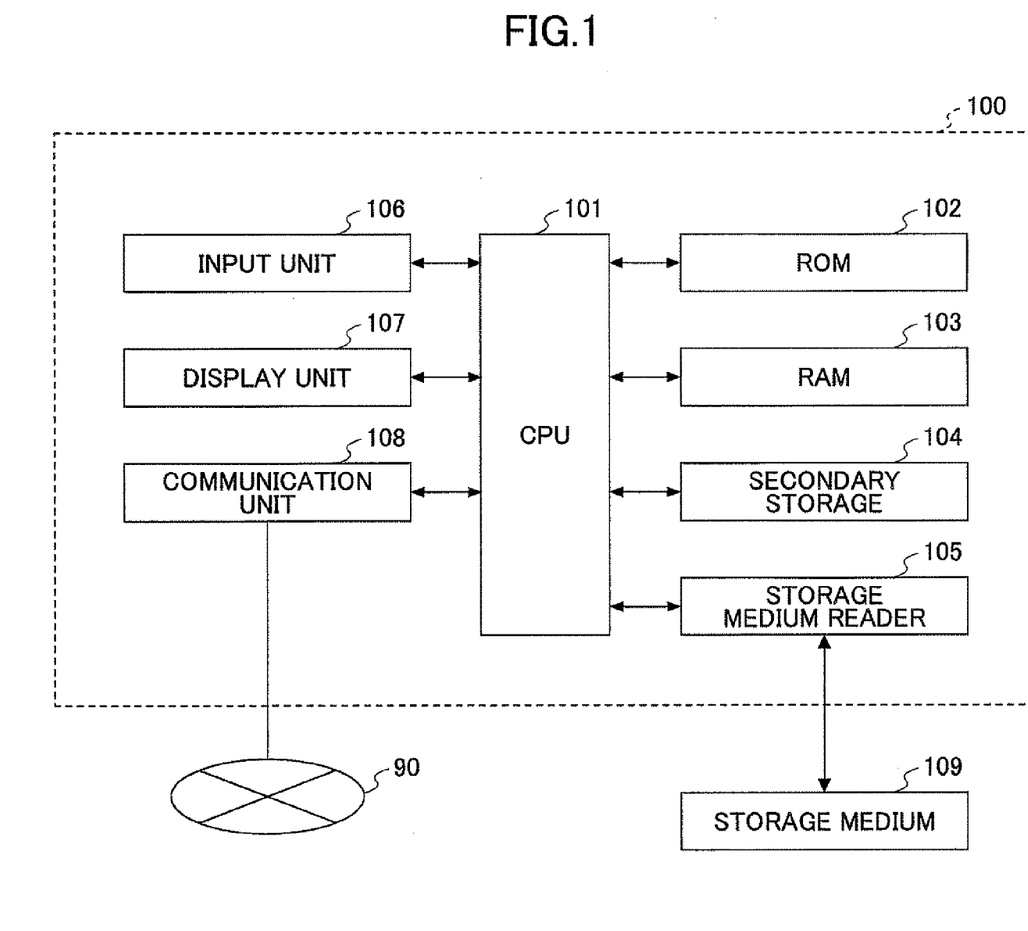
FIG. 1 is a block diagram illustrating a hardware configuration of an information processor according to an embodiment of the present invention.

FIG. 1 is a block diagram illustrating a hardware configuration of the information processor 100 according to this embodiment.

The information processor 100 includes a central processing unit (CPU) 101, a read-only memory (ROM) 102, a random access memory (RAM) 103, a secondary storage 104, a storage medium reader 105, an input unit 106, a display unit 107, and a communication unit 108.

The CPU 101 includes a microprocessor and its peripheral circuits, and controls the information processor 100. The ROM 102 is a memory containing predetermined control programs (software components) executed by the CPU 101. The RAM 103 is a memory used as a work area when the CPU 101 executes predetermined programs stored in the ROM 102 or the secondary storage 104 and performs various control operations.

The secondary storage 104 stores a general-purpose operating system (OS) and various information items including various programs. A hard disk drive (HDD), which is a nonvolatile storage, may be used as the secondary storage 104.

The storage medium reader 105 is a reading unit for reading a storage medium (or a recording medium) 109 such as a compact disk (CD) or a portable memory loaded from outside and entering or recording data in the information processor 100. In the case where the storage medium 109 retains a sales package, the sales package may be installed in the information processor 100 from the storage medium 109 through the storage medium reader 105.

The input unit 106 is provided for a user to perform various operations for inputting data. The input unit 106 includes one or more of a mouse, a keyboard, and a touchscreen switch provided over the display screen of the display unit 107.

The display unit 107 is configured to display various data items on its display screen. The display unit 107 includes, for example, a liquid crystal display (LCD) or a cathode ray tube (CRT).

The communication unit 108 is configured to perform communications with other devices or apparatuses through a network 90 such as a local area network (LAN) or the Internet. The communication unit 108 is configured to support various forms of network communications including wired communications and wireless (radio) communications.

As described above, it is the sales package that is a software unit visible to users. Therefore, according to this embodiment, the sales package is input from outside to the information processor 100 via the storage medium reader 105 or the communication unit 108 (through the network 90).

An information processing program according to this embodiment may be prestored in the secondary storage 104. Alternatively, the information processing program may be retained in the storage medium 109 (such as a CD or a portable memory) and be input to (installed in) the information processor 100 through the storage medium reader 105. Further, it is also possible to download the information processing program from, for example, an external server, through the network 90 connected to the communication unit 108, and to install the information processing program via the communication unit 108.

Next, a description is given of a functional configuration of the information processor 100 according to this embodiment.

Figure 2:
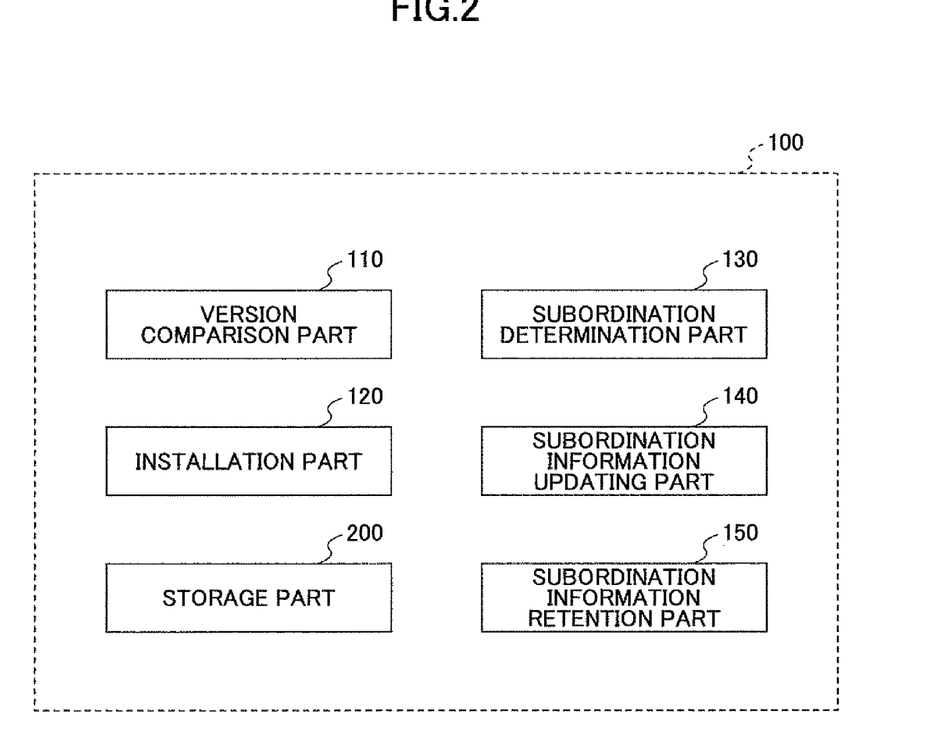
FIG. 2 is a block diagram illustrating a functional configuration of the information processor according to the embodiment of the present invention.

FIG. 2 is a block diagram illustrating a functional configuration of the information processor 100 according to this embodiment.

The information processor 100 includes a version comparison part 110, an installation part 120, a subordination (dependence) determination part 130, a subordination (dependence) information updating part 140, a subordination (dependence) information retention part 150, and a storage part 200.

The storage part 200 stores and contains data such as installed programs (such as function packages) and subordination information (to be described below). The storage part 200 may be implemented by the secondary storage 104, for example.

The subordination information retention part 150 is configured as follows. With respect to individual programs stored in the storage part 200, that is, installed in the information processor 100, the subordination information retention part 150 correlates information on one or more sales packages in which a program has been included (package information) with the version information (information on one or more corresponding versions) of the program and retains the package information and the version information as subordination information in the storage part 200. A description is given below of the subordination information.

The version comparison part 110 is configured as follows. When a program (for example, a function package) to be installed in the storage part 200 (the information processor 100) has already been installed, the version comparison part 110 compares information on the version of the program to be installed with the version information (information on an installed version) of the program correlated with the same package information as the version of the program to be installed and retained by the subordination information retention part 150 (in the storage part 200).

The subordination determination part 130 is configured to determine whether the program to be installed is subordinate to, that is, included in, a sales package other than the sales package in which the program to be installed is included by, for example, comparing the package information of the program to be installed with the package information of the program retained by the subordination information retention part 150 (in the storage part 200) or determining whether the package information related to the program to be installed matches the package information retained in the storage part 200 with respect to (in correlation with) the program.

The installation part 120 installs the program to be installed in the storage part 200.

The subordination information updating part 140 is configured to update the version information of the program correlated with the same package information as the version of the program to be installed and retained by the subordination information retention part 150 using the information on the version of the program to be installed. For example, the subordination information updating part 140 replaces (overwrites) the information on the installed version of the program correlated with the same package information as the version of the program to be installed and retained by the subordination information retention part 150 with the information on the version of the program to be installed.

The above-described functional parts 110 through 150 and 200 may be implemented by the CPU 101 executing an information processing program according to one embodiment of the present invention.

A description is given below of installation, updating (upgrading and downgrading), and uninstallation of a sales package in the case of including (containing) a function package shared with another sales package (that is, shared by multiple sales packages).

When a sales package is installed, a function package included in the sales package is installed. At this point, the package information of the sales package which the function package belongs to (is included in), such as the name or identifier of the sales package, and the version information (information on the version) of the function package included in the sales package are stored as information related to the function package on a function package basis. The package information may also include the version information of the sales package. These stored information items may be referred to as subordination (dependence) information.

Figure 3:
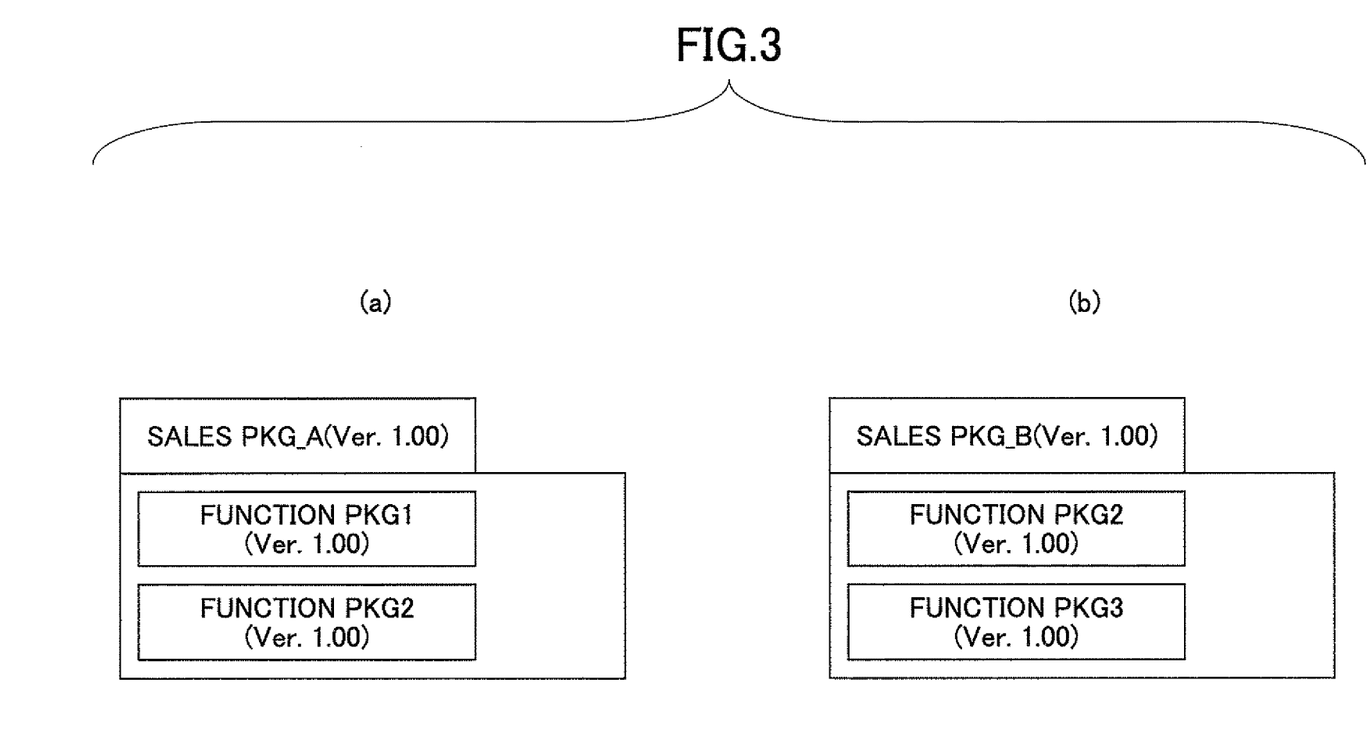
FIG. 3 is a diagram illustrating configurations of two sales packages according to the embodiment of the present invention.

FIG. 3 is a diagram illustrating configurations of two sales packages according to this embodiment. A single sales package (also abbreviated as "sales PKG" in this embodiment) includes at least one function package (also abbreviated as "function PKG" in this embodiment).

In FIG. 3, (a) illustrates SALES PKG_A (ver. 1.00) and (b) illustrates SALES PKG_B (ver. 1.00). Referring to (a) of FIG. 3, SALES PKG_A (ver. 1.00) includes FUNCTION PKG 1 (ver. 1.00) and FUNCTION PKG 2 (ver. 1.00). Referring to (b) of FIG. 3, SALES PKG_B (ver. 1.00) includes FUNC-TION PKG 2 (ver. 1.00) and FUNCTION PKG 3 (ver. 1.00). Thus, SALES PKG_A (ver. 1.00) and SALES PKG_B (ver. 1.00) include (share) the same function package (of the same version), that is, FUNCTION PKG 2 (ver. 1.00).

Figure 4:
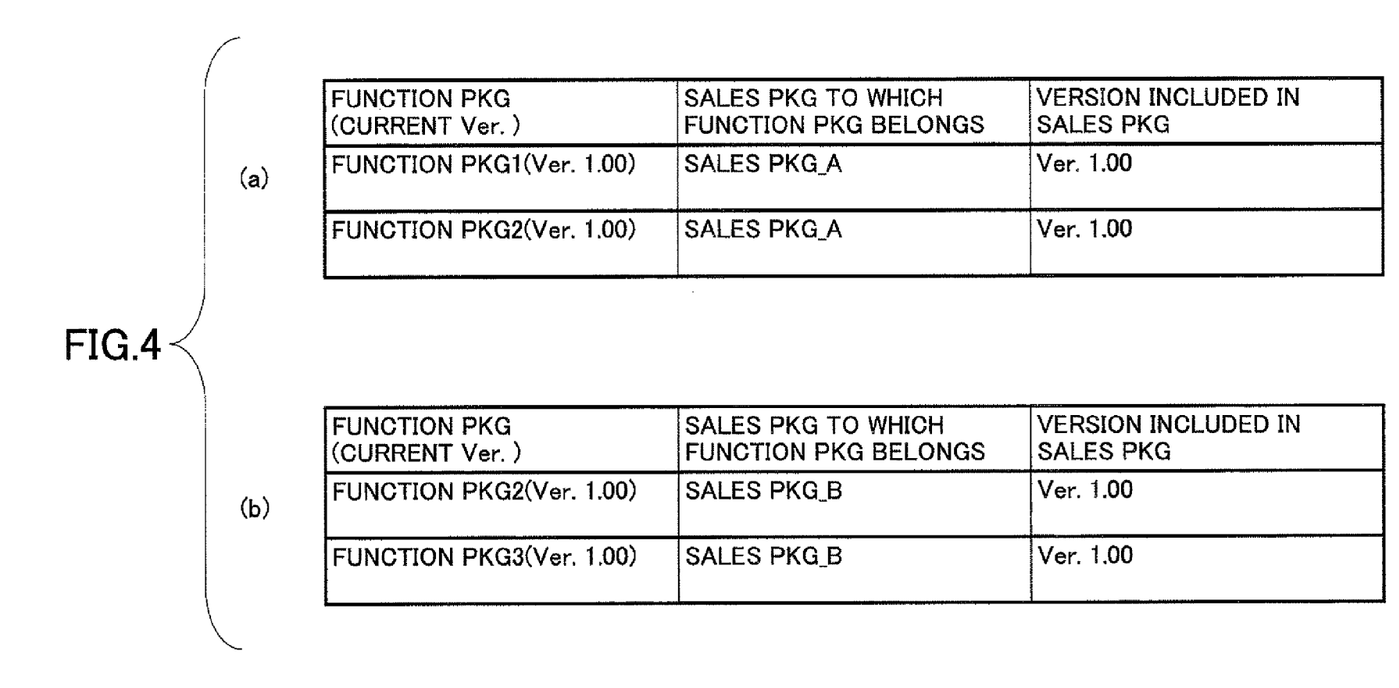
FIG. 4 illustrates subordination information stored in the information processor on a function package basis at the time of installing sales packages independently in the information processor according to the embodiment of the present invention.

FIG. 4 illustrates subordination information stored in the information processor 100 on a function package basis at the time of installing sales packages (SALES PKG_A (ver. 1.00) and SALES PKG_B (ver. 1.00)) independently in the information processor 100. In FIG. 4, (a) illustrates subordination information stored in the information processor 100 in the case of independently installing SALES PKG_A (ver. 1.00) in the information processor 100, and (b) illustrates subordination information stored in the information processor 100 in the case of independently installing SALES PKG_B (ver. 1.00) in the information processor 100.

A description is given of the subordination information referring to SALES PKG_A (ver. 1.00) by way of example. SALES PKG_A (ver. 1.00) includes FUNCTION PKG 1 (ver. 1.00) and FUNCTION PKG 2 (ver. 1.00). When SALES PKG_A (ver. 1.00) is independently installed in the information processor 100, the version information of each of installed FUNCTION PKG 1 (ver. 1.00) and FUNCTION PKG 2 (ver. 1.00) is correlated with the package information (for example, the name) of SALES PKG_A (ver. 1.00) in which FUNCTION PKG 1 (ver. 1.00) and FUNCTION PKG 2 (ver. 1.00) are included, and the correlated version information and package information are stored as subordination information on a function package basis (that is, in correlation with corresponding function packages).

Next, a description is given of a flow of installation and updating of a sales package in the information processor 100 according to this embodiment.

Figure 5:
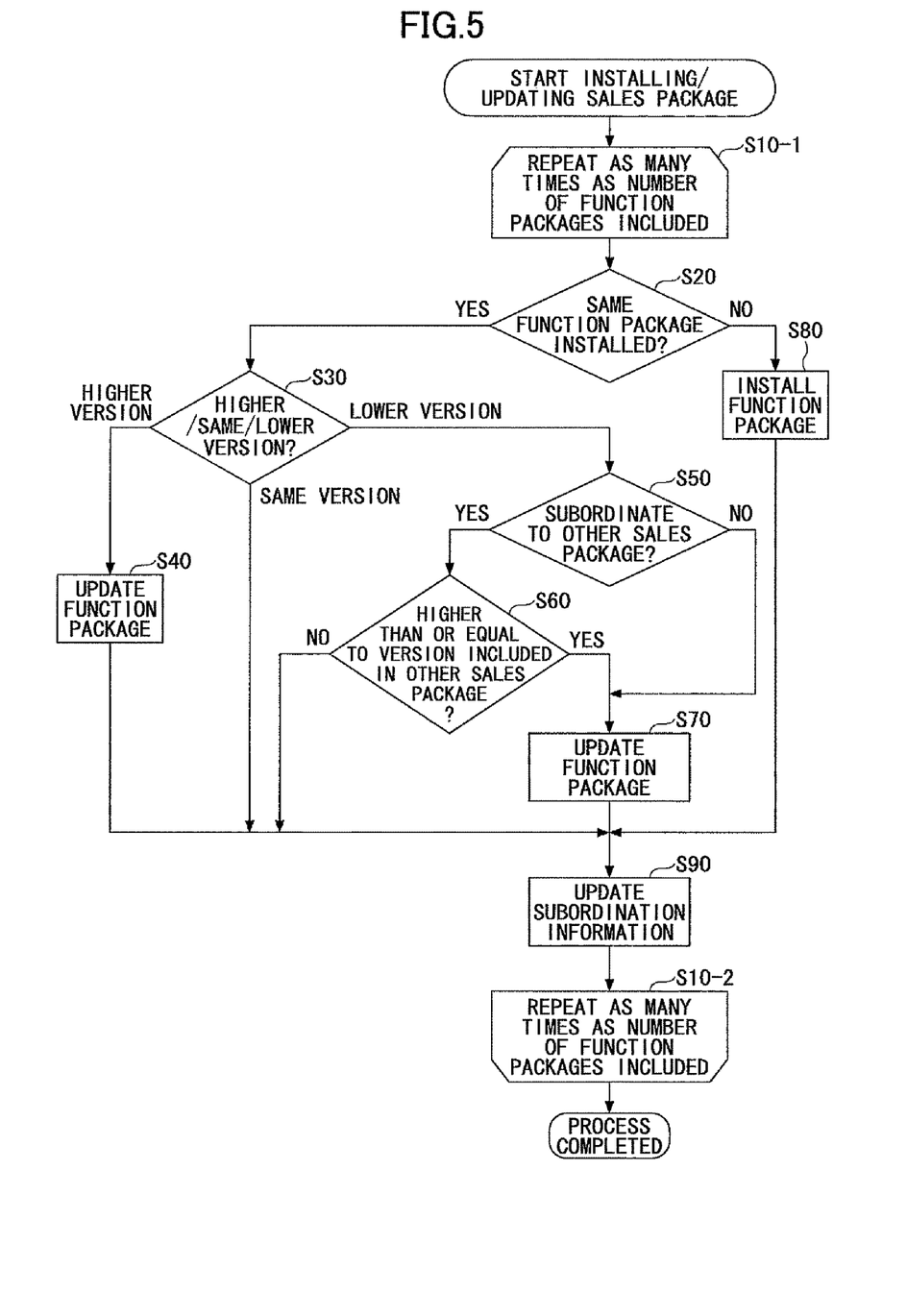
FIG. 5 is a flowchart illustrating a flow of installation and updating of a sales package in the information processor according to the embodiment of the present invention.

FIG. 5 is a flowchart illustrating a flow of installation and updating of a sales package in the information processor 100 according to this embodiment.

In this flowchart, while a user performs installation on a sales package basis, installation is performed on a function package basis in the information processor 100. Further, installation of a package means adding the package to the information processor 100 so that the information processor 100 includes the package. Further, updating of a package means replacing a version of the package already (currently) installed in the information processor 100 with a version of the package to be newly added to the information processor 100. At this point, if the version of the package to be newly added is different from the installed version of the package, updating means upgrading or downgrading of the package depending on the hierarchical relationship between the versions.

Referring to FIG. 5, when the information processor 100 starts installing or updating a sales package, the process between step S10-1 and step S10-2 is repeated as many times as the number of function packages included in a sales package to be installed. A description is given below, with reference to FIG. 5, of the individual processes between step S10-1 and step S10-2.

First, in step S20, the information processor 100 determines whether the same function package as a function package to be installed is already installed in the, information processor 100. If the same function package is already installed (YES in step S20), the process proceeds to step S30. If the same function package is not installed (NO in step S20), the process proceeds to step S80. In step S80, the installation part 120 installs the function package in (that is, adds the function package to) the storage part 200.

On the other hand, if the same function package as the function package to be installed is already installed in the information processor 100 (YES in step S20), in step S30, the version comparison part 110 compares the version of the function package to be installed and the installed version of the function package (of the same sales package as the function package to be installed). If the version of the function package to be installed is higher (in order) than its installed version, the process proceeds to step S40. On the other hand, if the version of the function package to be installed is lower (in order) than its installed version, the process proceeds to step S50. If the version of the function package is the same as its installed version, the process proceeds to step S90.

If the version of the function package to be installed is higher than its installed version, in step S40, the installation part 120 updates (upgrades) the function package by replacing the installed version with the higher version to be installed.

On the other hand, if the version of the function package to be installed is lower than its installed version, in step S50, the subordination determination part 130 determines whether the function package is subordinate to (included in) another sales package. If it is determined that the function package is subordinate to another sales package (YES in step S50), the process proceeds to step S60. If it is determined that the function package is subordinate to no other sales package (NO in step S50), the process proceeds to step S70.

In step S60, the version comparison part 110 determines whether the version of the function package to be installed is higher than or equal to the version of the function package included in the other sales package. If it is determined that the version of the function package to be installed is higher than or equal to the version of the function package included in the other sales package (YES in step S60), the process proceeds to step S70. If it is determined that the version of the function package to be installed is lower than the version of the function package included in the other sales package (NO in step S60), the process proceeds to step S90.

In step S70, the installation part 120 updates (downgrades) the function package in the storage part 200 by replacing the installed version with the version to be installed. In step S90, the subordination information updating part 140 updates the subordination information in the storage part 200 based on the version of the function package installed or updated.

Figure 6:
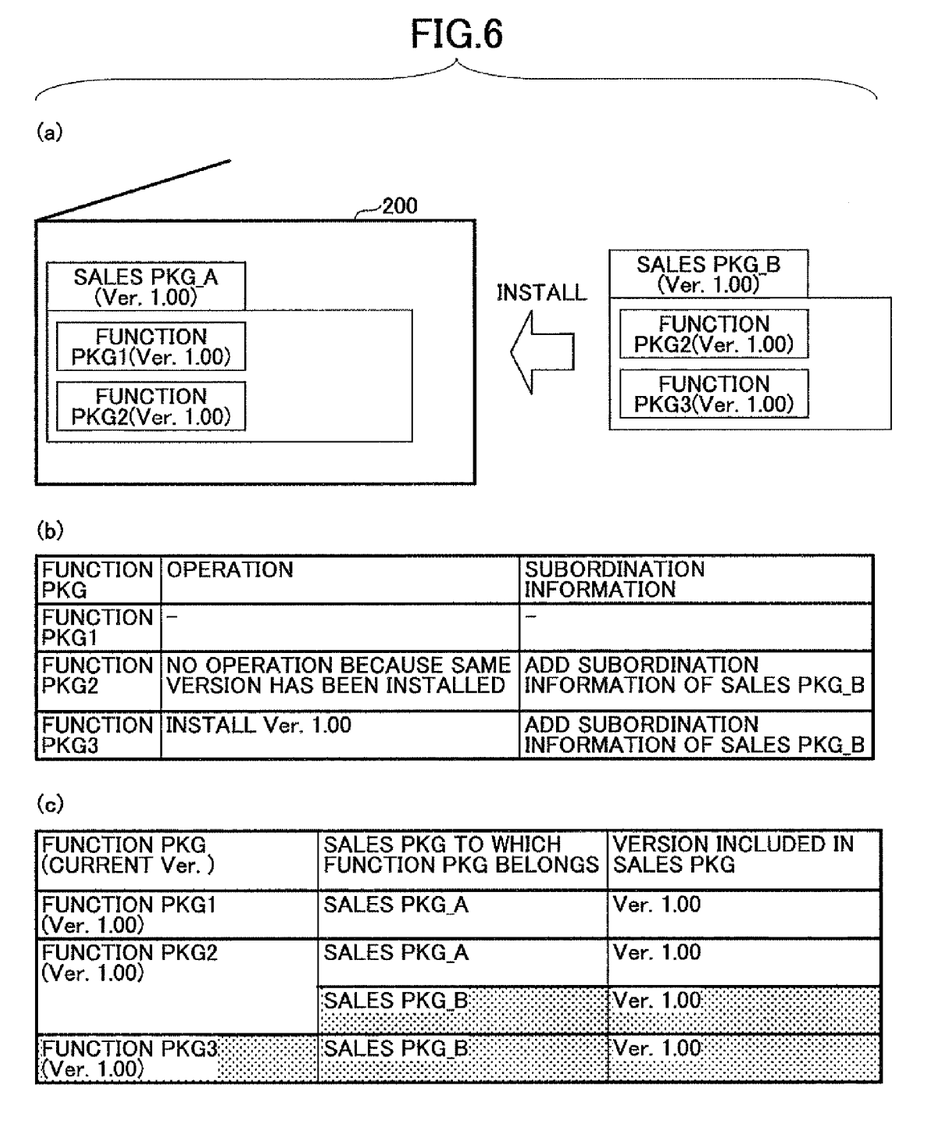
FIG. 6 illustrates operations and subordination information in the case of installing SALES PKG_B (ver. 1.00) in a storage part where SALES PKG_A (ver. 1.00) is already installed according to the embodiment of the present invention.

FIG. 6 illustrates operations and subordination information in the case of installing SALES PKG_B (ver. 1.00) in the storage part 200 (the information processor 100) where SALES PKG_A (ver. 1.00) is already installed in accordance with the flow illustrated in FIG. 5. The function packages included in SALES PKG_A (ver. 1.00) and SALES PKG_B (ver. 1.00) have the same configuration as illustrated in FIG. 3.

As illustrated in (a) of FIG. 6, SALES PKG_B (ver. 1.00) is installed in the information processor 100 where SALES PKG_A (ver. 1.00) has been installed. In this case, the same version as that to be installed has already been installed with respect to FUNCTION PKG 2 (ver. 1.00). Accordingly, FUNCTION PKG 2 is not updated, and package information "SALES PKG_B" is added to the subordination information of FUNCTION PKG 2 (ver. 1.00) as a sales PKG to which FUNCTION PKG 2 (ver. 1.00) belongs. Further, the version information (ver. 1.00) of FUNCTION PKG 2 is correlated with the package information "SALES PKG_B" and added to the subordination information of FUNCTION PKG 2 (ver. 1.00). On the other hand, with respect to FUNCTION PKG 3 (ver. 1.00), the version 1.00 is installed. Further, package information "SALES PKG_B" as a sales PKG to which FUNCTION PKG 3 (ver. 1.00) belongs and the version information (ver. 1.00) of FUNCTION PKG 3 correlated with the package information "SALES PKG_B" are stored as the subordination information of FUNCTION PKG 3 (ver. 1.00). In FIG. 6, (b) illustrates operations performed in the individual function packages, and (c) illustrates subordination information after installation.

Figure 7:
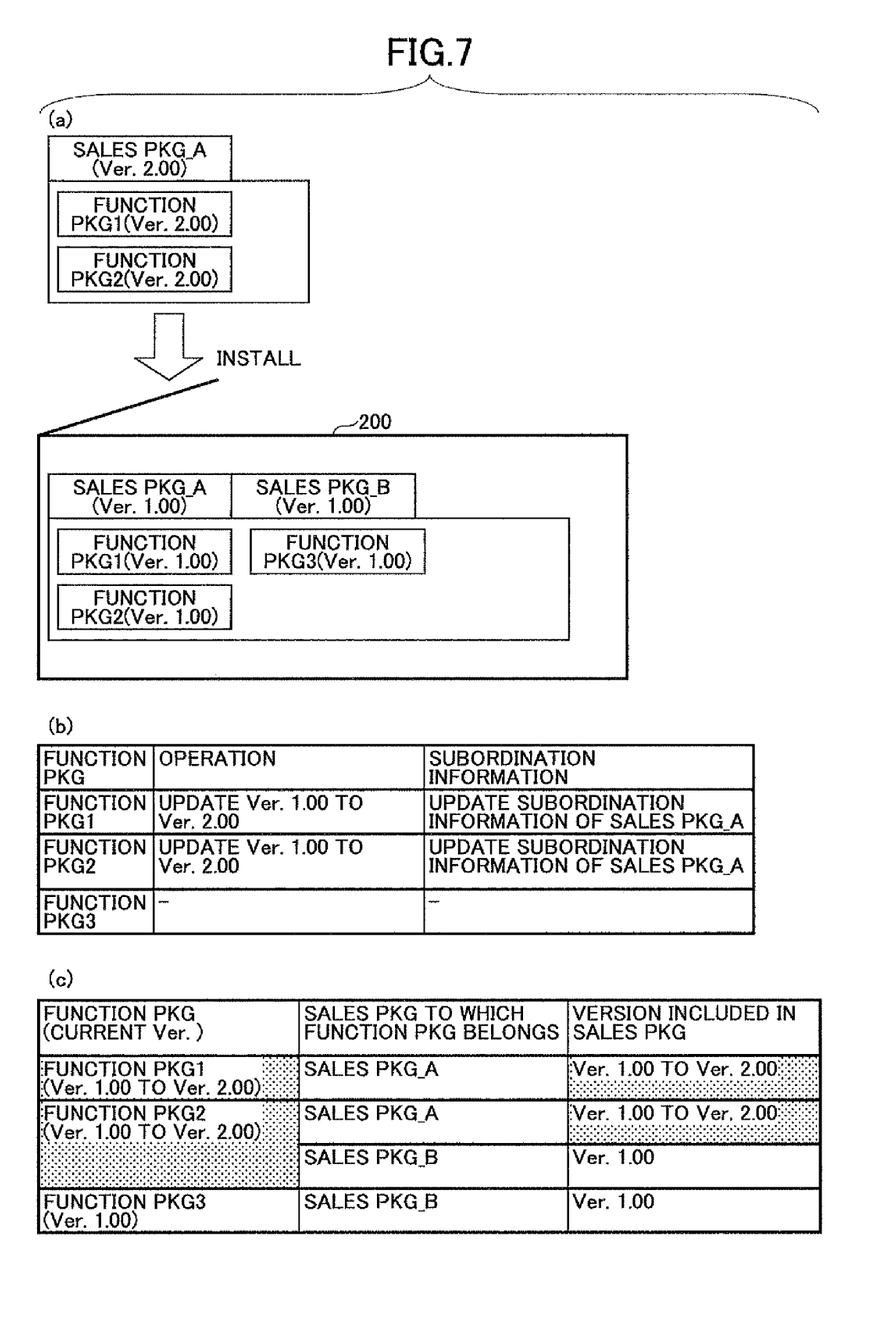
FIG. 7 illustrates operations and subordination information in the case of installing SALES PKG_A (ver. 2.00) in the storage part where SALES PKG_A (ver. 1.00) and SALES PKG_B (ver. 1.00) have been installed according to the embodiment of the present invention.

FIG. 7 illustrates operations and subordination information in the case of installing SALES PKG_A (ver. 2.00) in the storage part 200 (the information processor 100) as illustrated in FIG. 6, where SALES PKG_A (ver. 1.00) and SALES PKG_B (ver. 1.00) have been installed. In this case, current installation may mean re-installation or upgrading of SALES PKG_A because a lower version (ver. 1.00) of SALES PKG_A is already (previously) installed.

As illustrated in (a) of FIG. 7, SALES PKG_A (ver. 2.00) is installed in the storage part 200 where SALES PKG_A (ver. 1.00) and SALES PKG_B (ver. 1.00) have been installed. In this case, FUNCTION PKG 1 is updated (upgraded) from ver. 1.00 to ver. 2.00, and the version information of FUNCTION PKG 1 correlated with the package information of SALES PKG_A is updated from ver. 1.00 to ver. 2.00 in the subordination information of FUNCTION PKG 1. The version information of SALES PKG_A may also be updated from ver. 1.00 to ver. 2.00.

Likewise, FUNCTION PKG 2 is updated (upgraded) from ver. 1.00 to ver. 2.00, and the version information of FUNCTION PKG 2 correlated with the package information of SALES PKG_A is updated from ver. 1.00 to ver. 2.00 in the subordination information of FUNCTION PKG 2. Since FUNCTION PKG 3 is not included in installed SALES PKG_A (ver. 2.00) this time, FUNCTION PKG 3 is not installed. In FIG. 7, (b) illustrates operations performed in the individual function packages, and (c) illustrates subordination information after installation.

Figure 8:
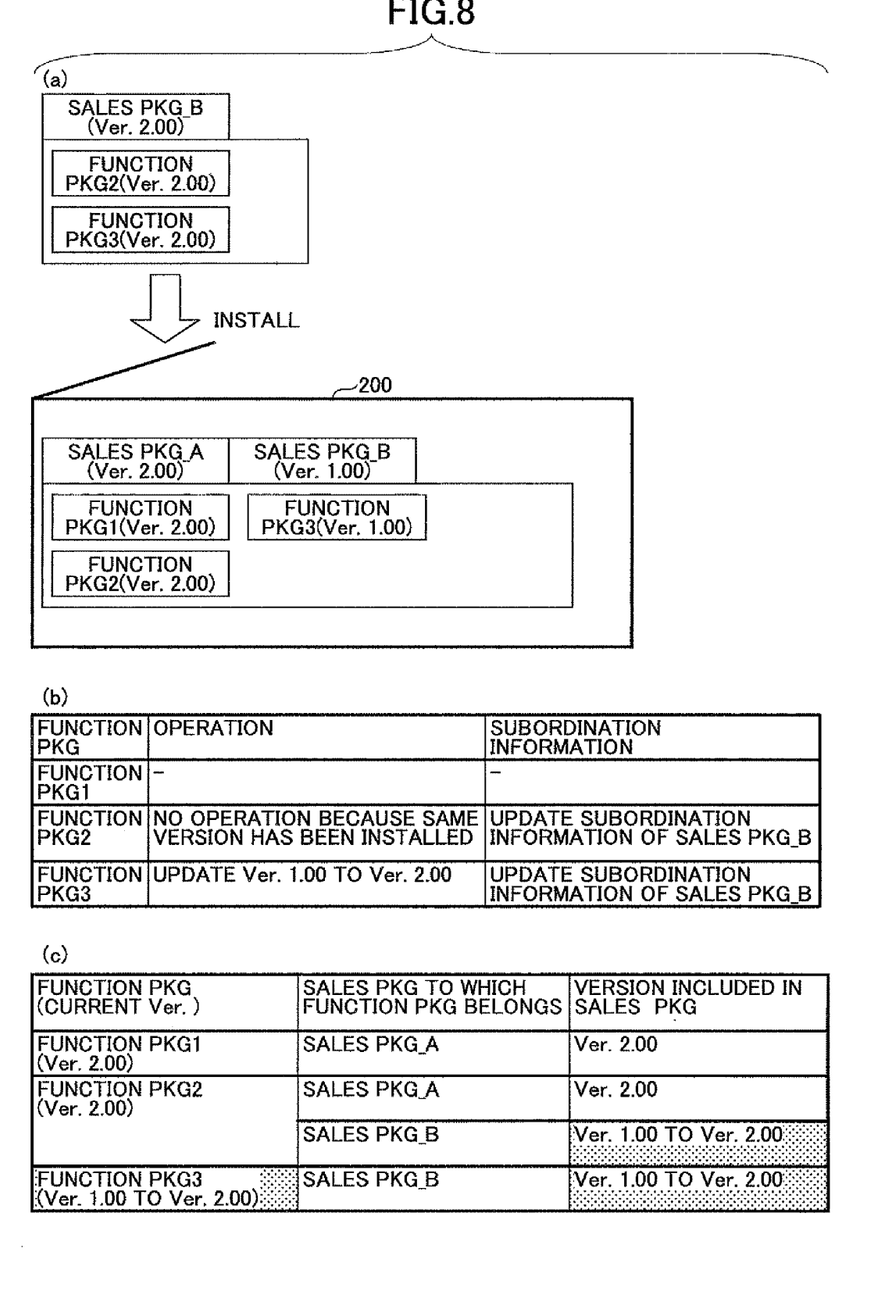
FIG. 8 illustrates operations and subordination information in the case of installing SALES PKG_B (ver. 2.00) in the storage part where SALES PKG_A (ver. 2.00) and SALES PKG_B (ver. 1.00) have been installed according to the embodiment of the present invention.

FIG. 8 illustrates operations and subordination information in the case of installing SALES PKG_B (ver. 2.00) in the storage part 200 (the information processor 100) after the installation illustrated in FIG. 7. In this case, current installation may mean re-installation or upgrading of SALES PKG_B because a lower version (ver. 1.00) of SALES PKG_B is already (previously) installed.

As illustrated in (a) of FIG. 8, SALES PKG_B (ver. 2.00) is installed in the storage part 200 where SALES PKG_A (ver. 2.00) and SALES PKG_B (ver. 1.00) have been installed. In this case, FUNCTION PKG 2 is not updated because the same version (ver. 2.00) has been installed, and the version information of FUNCTION PKG 2 correlated with the package information of SALES PKG_B is updated from ver. 1.00 to ver. 2.00 in the subordination information of FUNCTION PKG 2. FUNCTION PKG 3 is updated (upgraded) from ver. 1.00 to ver. 2.00, and the version information of FUNCTION PKG 3 correlated with the package information of SALES PKG_B is updated from ver. 1.00 to ver. 2.00 in the subordination information of FUNCTION PKG 3. The version information of SALES PKG_B, to which FUNCTION PKG 3 (ver. 2.00) belongs, may also be updated from ver. 1.00 to ver. 2.00. In FIG. 8, (b) illustrates operations performed in the individual function packages, and (c) illustrates subordination information after installation.

Figure 9:
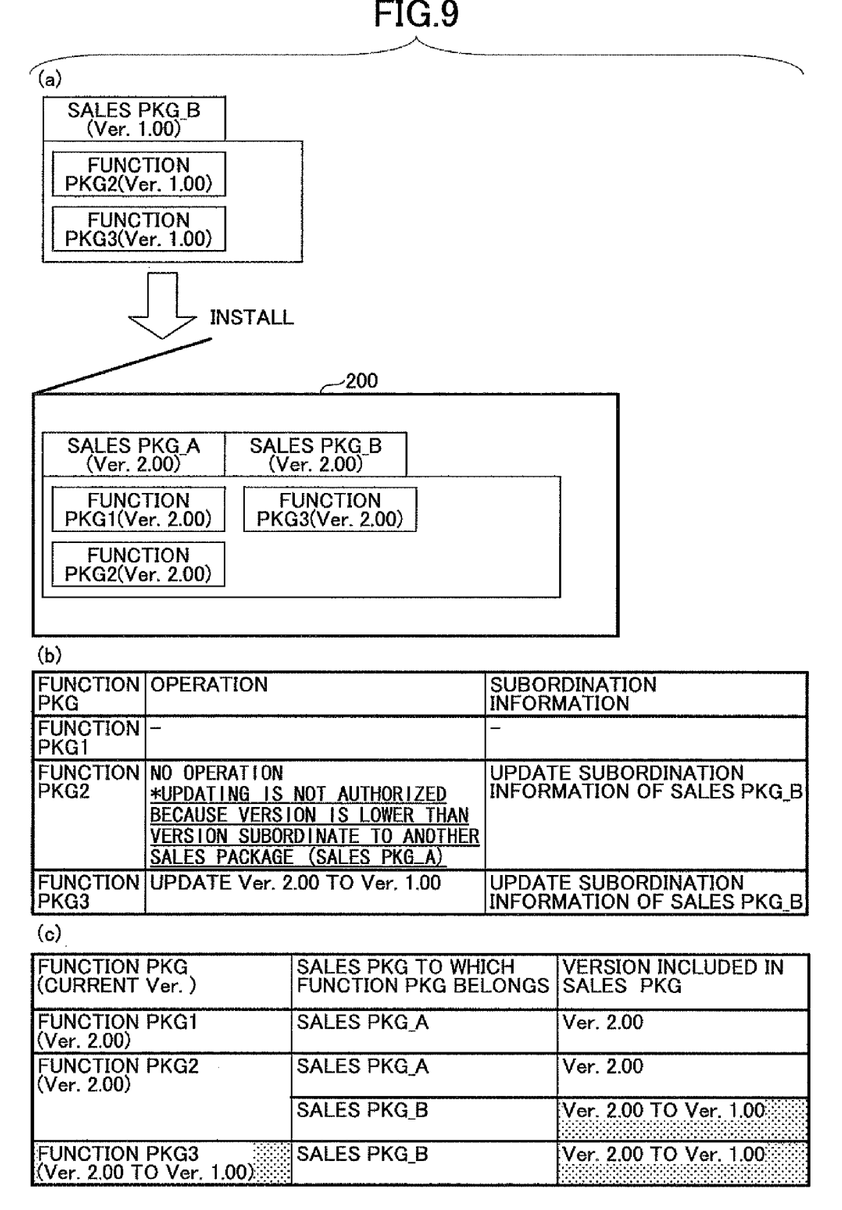
FIG. 9 illustrates operations and subordination information in the case of installing SALES PKG_B (ver. 1.00) in the storage part where SALES PKG_A (ver. 2.00) and SALES PKG_B (ver. 2.00) have been installed according to the embodiment of the present invention.

Next, FIG. 9 illustrates operations and subordination information in the case of installing SALES PKG_B (ver. 1.00) in the storage part 200 (the information processor 100) where SALES PKG_A (ver. 2.00) and SALES PKG_B (ver. 2.00) have been installed, that is, the storage part 200 after the installation illustrated in FIG. 8, in accordance with the process flow illustrated in FIG. 5.

As illustrated in (a) of FIG. 9, SALES PKG_B (ver. 1.00) is installed in the storage part 200 where SALES PKG_A (ver. 2.00) and SALES PKG_B (ver. 2.00) have been installed. In this case, current installation may mean re-installation or downgrading of SALES PKG_B because a higher version (ver. 2.00) of SALES PKG_B is already (previously) installed.

No installation is performed with respect to FUNCTION PKG 1 because FUNCTION PKG 1 is not included in SALES PKG_B (ver. 1.00) of this time.

The version (1.00) of FUNCTION PKG 2 included in SALES PKG_B (ver. 1.00) is lower than the version (2.00) of FUNCTION PKG 2 subordinate to another sales package (SALES PKG_A). Accordingly, the updating of FUNCTION PKG 2 is not authorized, so that no updating is performed with respect to FUNCTION PKG 2. The version information of FUNCTION PKG 2 correlated with the package information of SALES PKG_B is updated from ver. 2.00 to ver. 1.00 in the subordination information of FUNCTION PKG 2. That is, since FUNCTION PKG 2 is used (included) also in SALES PKG_A (ver. 2.00), FUNCTION PKG 2 is not updated (downgraded).

FUNCTION PKG 3 does not belong to any other sales package (than SALES PKG_B). Accordingly, FUNCTION PKG 3 is updated (downgraded) from ver. 2.00 to ver. 1.00, and the version information of FUNCTION PKG 3 correlated with the package information of SALES PKG_B is updated from ver. 2.00 to ver. 1.00 in the subordination information of FUNCTION PKG 3. The version information of SALES PKG_B, to which FUNCTION PKG 3 belongs, may also be updated from ver. 2.00 to ver. 1.00. In FIG. 9, (b) illustrates operations performed in the individual function packages, and (c) illustrates subordination information after installation.

Figure 10:
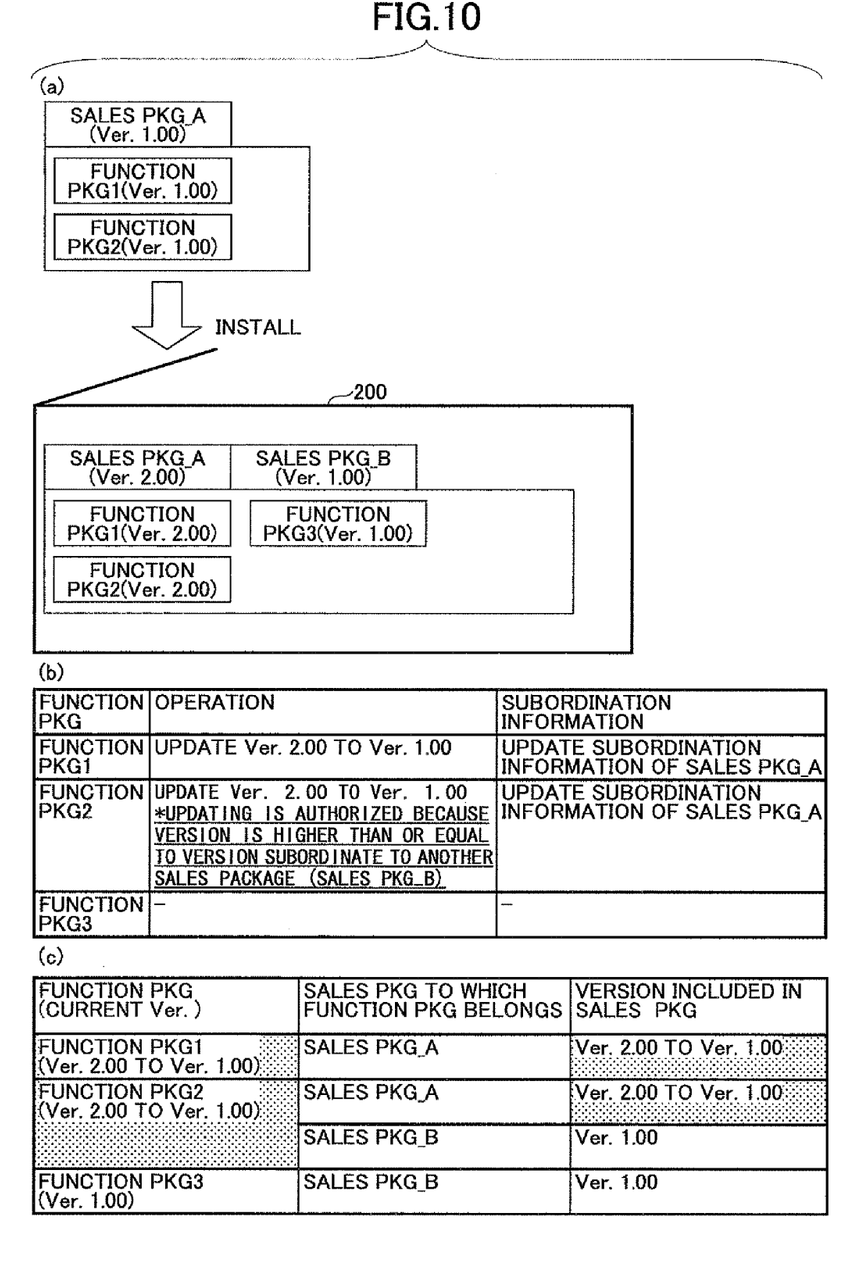
FIG. 10 illustrates operations and subordination information in the case of installing SALES PKG_A (ver. 1.00) in the storage part after the installation illustrated in FIG. 9 according to the embodiment of the present invention.

Further, FIG. 10 illustrates operations and subordination information in the case of installing SALES PKG_A (ver. 1.00) in the storage part 200 (the information processor 100) after the installation illustrated in FIG. 9.

As illustrated in (a) of FIG. 10, SALES PKG_A (ver. 1.00) is installed in the storage part 200 where SALES PKG_A (ver. 2.00) and SALES PKG_B (ver. 1.00) have been installed. In this case, current installation may mean re-installation or downgrading of SALES PKG_A because a higher version (ver. 2.00) of SALES PKG_A is already (previously) installed.

FUNCTION PKG 1 is updated (downgraded) from ver. 2.00 to ver. 1.00, and the version information of FUNCTION PKG 1 correlated with the package information of SALES PKG_A is updated from ver. 2.00 to ver. 1.00 in the subordination information of FUNCTION PKG 1. The version information of SALES PKG_A, to which FUNCTION PKG 1 belongs, may also be updated from ver. 2.00 to ver. 1.00.

The version (1.00) of FUNCTION PKG 2 included in SALES PKG_A (ver. 1.00) is higher than or equal to the version (1.00) of FUNCTION PKG 2 subordinate to another sales package (SALES PKG_B). Accordingly, the updating of FUNCTION PKG 2 is authorized, so that FUNCTION PKG 2 is updated (downgraded) from ver. 2.00 to ver. 1.00. The version information of FUNCTION PKG 2 correlated with the package information of SALES PKG_A is updated from ver. 2.00 to ver. 1.00 in the subordination information of FUNCTION PKG 2. As described above, the version information of SALES PKG_A, to which FUNCTION PKG 2 belongs, may also be updated from ver. 2.00 to ver. 1.00. In FIG. 10, (b) illustrates operations performed in the individual function packages, and (c) illustrates subordination information after installation.

As described above, in the case of installing SALES PKG_B (ver. 1.00) in FIG. 9, downgrading FUNCTION PKG 2 from a currently installed version (ver. 2.00) to a lower version (ver. 1.00) may cause a malfunction because FUNCTION PKG 2 (ver. 2.00) is also used (included) in the other SALES PKG_A. Accordingly, FUNCTION PKG 2 is not updated (downgraded) to its lower version (ver. 1.00), and the version information of FUNCTION PKG 2 correlated with the package information of SALES PKG_B is updated to ver. 1.00 in the subordination information of FUNCTION PKG 2. On the other hand, in the case of thereafter installing SALES PKG_A (ver. 1.00) as illustrated in FIG. 10, FUNCTION PKG 2 is downgraded to ver. 1.00. This makes it possible to safely update (downgrade) a sales package including a shared function package.

According to an information processor and an information processing method of this embodiment, the correlation between installed program components (programs) and corresponding packages to which the installed program components respectively belong is retained in the information processor. At the time of downgrading a package, if a program component of the package is subordinate to (included in) another package, it is determined whether the downgrade of the program component is higher than or equal to the version of the program component included in the other package before downgrading the individual components of the package. If the downgrade of the program component is not higher than or equal to, that is, lower than the version of the program component included in the other package, downgrading is prevented.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

The present application is based upon and claims the benefit of priority of Japanese Patent Application No. 2009-168441, filed on Jul. 17, 2009, and Japanese Patent Application No. 2010-143835, filed on Jun. 24, 2010, the entire contents of which are incorporated herein by reference.

What is claimed is:

1. An information processing method in an information processor where one or more programs included in one or more packages are installed in a storage part on a package basis, the programs including package information of the respective packages and version information of respective versions, and the package information is correlated with the version information and the correlated package information and version information are retained in the storage part on a program basis, the information processing method comprising:

comparing, if one of the installed programs is to be installed, the version information of the installed one of the programs with version information of the one of the programs to be installed;

determining whether the one of the programs to be installed is subordinate to a package other than a package including the one of the programs to be installed, if the comparison by said comparing determines that the version information of the one of the programs to be installed is lower than the compared version information;

installing the one of the programs to be installed if said determining determines that the one of the programs to be installed is not subordinate to the other package; and updating the version information of the installed one of the programs retained by the subordination information retention part and correlated with a same package as the package including the one of the programs to be installed is included, using the version information of the one of the programs to be installed, wherein said comparing compares the version information of the one of the programs to be installed with the version information of the one of the programs retained in correlation with the other package, if said determining determines that the one of the programs to be installed is subordinate to the other package, and wherein said installing downgrades the version of the installed one of the programs by installing the one of the programs to be installed in the storage part, if said determining determines that the one of the programs to be installed is not subordinate to the other package or if the comparison by said comparing determines that the version information of the one of the programs to be installed is higher than or equal to the version information of the one of the programs retained in correlation with the other package.

2. The information processing method as claimed in claim 1, wherein said installing prevents the one of the programs to be installed from being installed in the storage part if the comparison by the version comparison part determines that the version information of the one of the programs to be installed is lower than the version information of the one of the programs retained in correlation with the other package.

3. An information processor, comprising:
a storage part configured to store one or more programs included in one or more packages and installed on a package basis, the programs including package information of the respective packages and version information of respective versions;
a subordination information retention part configured to correlate the package information with the version information and retain the correlated package information and version information in the storage part on a program basis;
a version comparison part configured to compare, if one of the installed programs is to be installed, the version information of the installed one of the programs with version information of the one of the programs to be installed;
a subordination determination part configured to determine whether the one of the programs to be installed is subordinate to a package other than a package including the one of the programs to be installed, if the comparison by the version comparison part determines that the version information of the one of the programs to be installed is lower than the compared version information;
an installation part configured to install the one of the programs to be installed if the subordination determination part determines that the one of the programs to be installed is not subordinate to the other package; and
a subordination information updating part configured to update the version information of the installed one of the programs retained by the subordination information retention part and correlated with a same package as the package including the one of the programs to be installed, using the version information of the one of the programs to be installed,
wherein the version comparison part is configured to compare the version information of the one of the programs to be installed with the version information of the one of the programs retained in correlation with the other package, if the subordination determination part determines that the one of the programs to be installed is subordinate to the other package, and
wherein the installation part is configured to downgrade the version of the installed one of the programs by installing the one of the programs to be installed in the storage part, if the subordination determination part determines that the one of the programs to be installed is not subordinate to the other package or if the comparison by the version comparison part determines that the version information of the one of the programs to be installed is higher than or equal to the version information of the one of the programs retained in correlation with the other package.

4. The information processor as claimed in claim 3, wherein the installation part is configured to prevent the one of the programs to be installed from being installed in the storage part if the comparison by the version comparison part determines that the version information of the one of the programs to be installed is lower than the version information of the one of the programs retained in correlation with the other package.

5. A non-transitory computer-readable storage medium storing a program for causing a processor of a computer to execute the information processing method as set forth in claim 1.

* * * * *